(12) United States Patent
Lee et al.

(10) Patent No.: US 8,446,106 B2
(45) Date of Patent: May 21, 2013

(54) LIGHT EMITTING DIODE DRIVING SYSTEM

(75) Inventors: Chi-Hsiung Lee, Jhongli (TW);
Yu-Hsiao Chao, Jhongli (TW)

(73) Assignee: Ampower Technology Co., Ltd.,
Jhongli, Taoyuan County (TW)

( * ) Notice: Subject to any disclaimer, the term of this patent is extended or adjusted under 35 U.S.C. 154(b) by 201 days.

(21) Appl. No.: 13/165,774

(22) Filed: Jun. 21, 2011

(65) Prior Publication Data

US 2012/0139420 A1    Jun. 7, 2012

(30) Foreign Application Priority Data

Dec. 1, 2010  (CN) .......................... 2010 2 0634564

(51) Int. Cl.
*H05B 41/36* (2006.01)
*H05B 37/02* (2006.01)

(52) U.S. Cl.
USPC ........ 315/294; 315/185 R; 315/224; 315/291; 315/306; 315/307

(58) Field of Classification Search
USPC .................. 315/122, 185 R, 209 R, 225, 291, 315/294, 306, 307, 308
See application file for complete search history.

(56) References Cited

U.S. PATENT DOCUMENTS

| 4,017,847 | A  | * | 4/1977  | Burford et al. ................. 345/46 |
| 4,658,199 | A  | * | 4/1987  | Hoffman ....................... 320/143 |
| 6,600,274 | B1 |   | 7/2003  | Hughes |
| 2010/0333113 | A1 | * | 12/2010 | Johnson et al. ............... 719/318 |
| 2011/0089865 | A1 | * | 4/2011  | Wang et al. ................... 315/297 |
| 2011/0309758 | A1 | * | 12/2011 | Yu et al. ........................ 315/192 |

FOREIGN PATENT DOCUMENTS

CN    2884777 Y    3/2007

* cited by examiner

*Primary Examiner* — Douglas W Owens
*Assistant Examiner* — Thai Pham
(74) *Attorney, Agent, or Firm* — Altis Law Group, Inc.

(57) ABSTRACT

A light emitting diode (LED) driving system comprises a plurality of current limitation circuits and a plurality of over-voltage protection circuits to driving a plurality of LED strings. Each of the current limitation circuits comprises a first switch comprising a control pole receiving a reference voltage, a first pole correspondingly connected to a LED string, and a second pole connected to the ground via a first resistor and a second switch comprising a control pole connected to the second pole of the first switch via a second resistor, a first pole receiving the reference voltage, and a second pole grounded. Each of the over-voltage protection circuits comprises a zener diode, a third switch and a first capacitor.

6 Claims, 4 Drawing Sheets

LIGHT EMITTING DIODE DRIVING SYSTEM

BACKGROUND

1. Technical Field

The disclosure relates to power supply systems, and particularly to a light emitting diode driving system.

2. Description of Related Art

Light emitting diodes (LEDs) are used as backlights of a display due to environment friendly merits and high contrast of the LEDs. Usually a plurality of light emitting diode (LED) strings, each including a plurality of LEDs connected in series, are connected in parallel in the screen. Thus, in order to maintain current balance of each of the plurality of LED strings, each of the plurality of LED strings is connected to a voltage and/or current detection circuit and a switch to detect corresponding voltage and/or current to feedback to a PWM controller. Then the PWM controller controls voltage outputted to the plurality of LED strings, and controls on and off of the switches to adjust the current flowing through the plurality of LED strings. However, the structure is too complicated, and increases costs.

DETAILED DESCRIPTION

Figure 1:
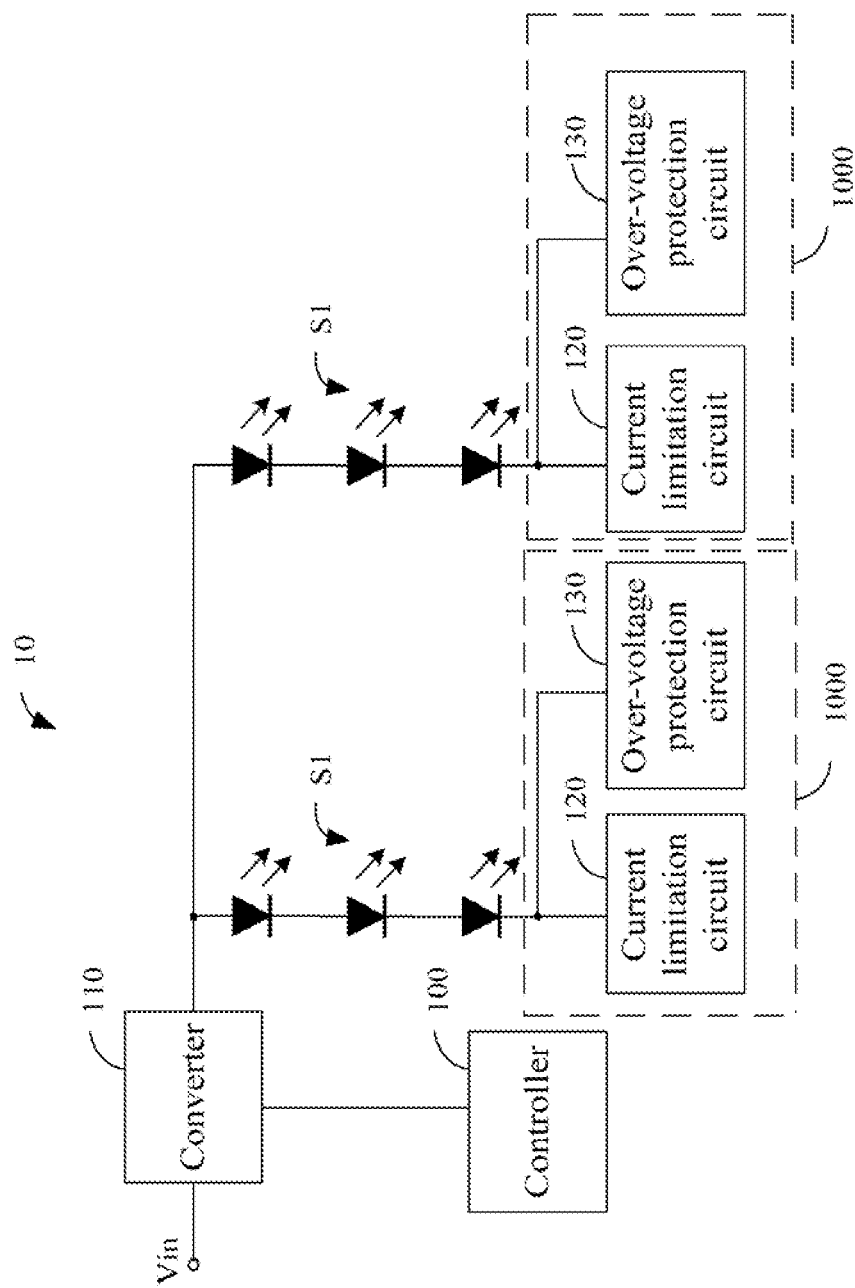
FIG. 1 is a schematic diagram of one embodiment of a light emitting diode (LED) driving system as disclosed.

FIG. 1 is a schematic diagram of one embodiment of a light emitting diode (LED) driving system 10 as disclosed. In the embodiment, the LED driving system 10 is configured and structured to drive a plurality of LED strings S1, and comprises a controller 100, a converter 110, a plurality of current limitation circuits 120 and a plurality of over-voltage protection circuits 130. Numbers of the current limitation circuits 120 and the over-voltage protection circuits 130 correspond to number of the LED strings S1. In the embodiment, one of the current limitation circuits 120 and one of the over-voltage protection circuits 130 are connected in parallel to form a parallel connection circuit 1000 which is connected to one of the LED strings S1 in series. FIG. 1 shows the parallel connection circuits 1000 connected to cathodes of last LEDs of the LED strings S1, respectively. The converter 110 convert an external power signal Vin to a direct current power signal able to drive the LED strings S1.

In the embodiment, the external power signal Vin is a direct current signal. The controller 100 controls the converter 110 to convert the external direct current power signal Vin into a suitable direct current signal, and then the suitable direct current signal is transmitted to drive the LED strings S1. The converter 110 may be boost, buck, isolation, non-isolation, half-bridge or full-bridge circuits. The current limitation circuits 120 actively limit current flowing through the corresponding LED strings S1 to make the current flowing through the LED strings S1 balanced. The over-voltage protection circuits 130 protect the corresponding LED strings S1 from over-voltages.

Figure 2:
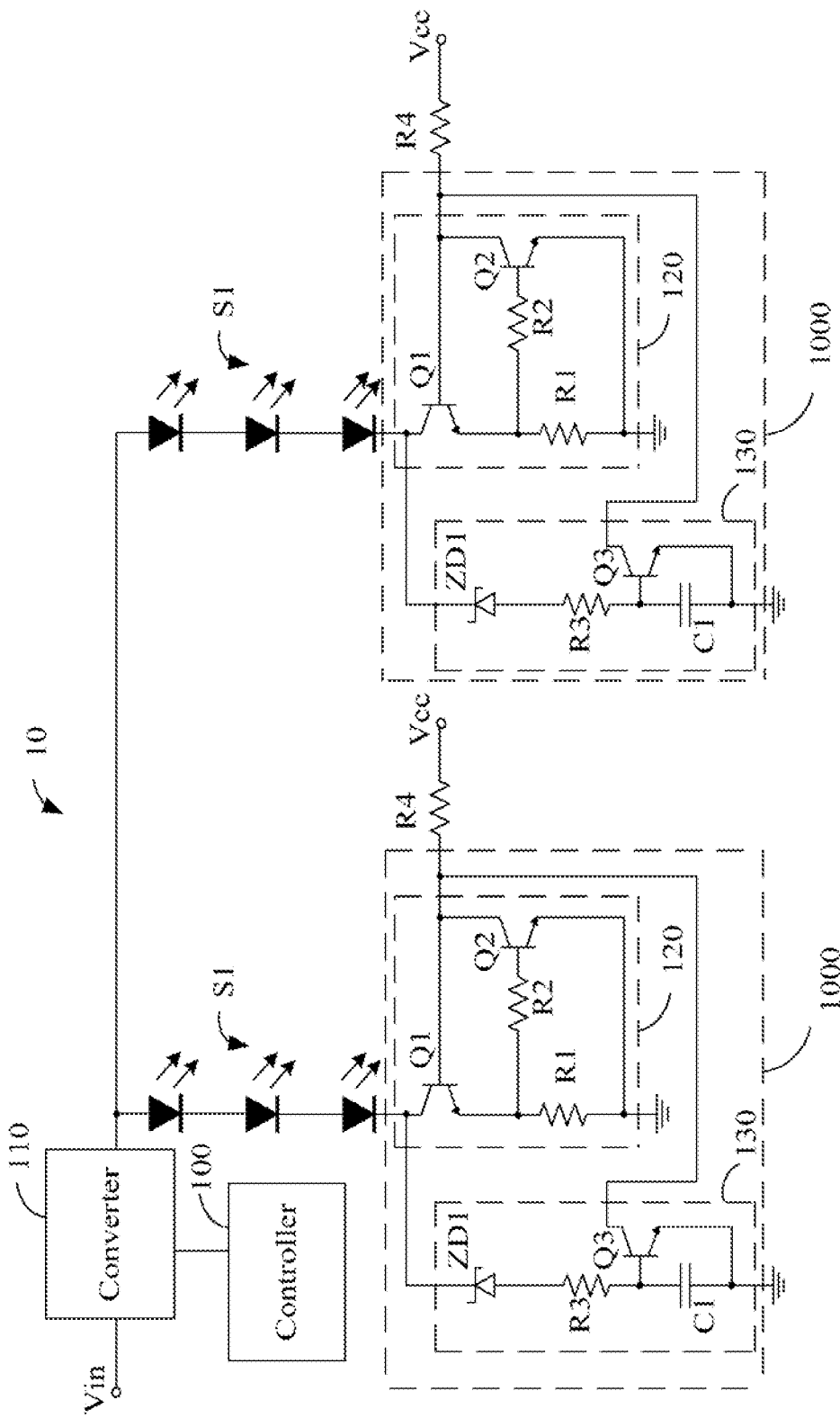
FIG. 2 is a circuit diagram of one embodiment of a LED driving system as disclosed.

FIG. 2 is a circuit diagram of one embodiment of the LED driving system 10 as disclosed. Each of the current limitation circuit 120 comprises a first switch Q1, a second switch Q2, a first resistor R1 and a second resistor R2. The first switch Q1 comprises a control pole receiving a reference voltage Vcc, a first pole connected to a corresponding LED string S1, especially to a cathode of a last LED of the corresponding LED string S1, and a second pole connected to the ground via the first resistor R1. The second switch Q2 comprises a control pole connected to the second pole of the first switch Q1 via the second resistor R2, a first pole receiving the reference voltage Vcc and a second pole grounded.

The over-voltage protection circuit 130 comprises a zener diode ZD1, a third resistor R3, a third switch Q3 and a first capacitor C1. A cathode of the zener diode ZD1 is correspondingly connected to the cathode of the last LED of the corresponding LED string S1, and an anode of the zener diode ZD1 is connected to one end of the third resistor R3. The third switch Q3 comprises a control pole connected to the other end of the third resistor R3, a first pole receiving the reference voltage Vcc and a second pole grounded. The first capacitor C1 is connected between the other end of the third resistor R3 and the ground.

In the embodiment, the control pole of the first switch Q1, the first pole of the second switch Q2 and the first pole of the third switch Q3 all receive the reference voltage Vcc via a fourth resistor R4. In the embodiment, the first switch Q1 and the second resistor Q2 are both NPN bipolar junction transistors, and the third switch Q3 is a NPN transistor. The control poles of the first switch Q1, the second switch Q2 and the third switch Q3 are bases, the first poles of the first switch Q1, the second switch Q2 and the third switch Q3 are collectors, and the second poles of the first switch Q1, the second switch Q2 and the third switch Q3 are emitters.

In alternative embodiments, the first switch Q1, the second switch Q2, and the third switch Q3 may both be BJTs transistors or metal oxide semiconductor field effect transistors.

In the embodiment, when current flowing through the LED strings S1 is normal, the first switch Q1 is turned on, and the second switch Q2 is turned off. When the current flowing through the LED strings S1 increases, voltage on the first resistor R1 increases correspondingly. When the voltage on the first resistor R1 exceeds threshold voltage of the second switch Q2, the second switch Q2 is turned on. Thus, the reference voltage Vcc is grounded via the fourth resistor R4, and voltage at the base of the first switch Q1 is decreases. Therefore, the first switch Q1 is turned off, and a loop of each of the LED strings S1 is cut off, which limits the current flowing through the LED strings S1. Thus, the current limitation circuits 120 actively limit the increased current flowing through the LED strings S1 to protect the LED strings S1 without control of the controller 100.

When the LED strings S1 work normally, the third switch Q3 is turned off. If there is an over-voltage state in the LED strings S1, the zener diode ZD1 is broken down, and the voltage on the third resistor R3 and the first capacitor C1 increases, which causes the third switch Q3 to be turned on. Thus, the voltage at the base of the first switch Q1 is grounded, which causes the first switch Q1 to be turned off. So the over-voltage protection circuits 130 protect the LED strings S1 from over-voltage without control of the controller 100.

Figure 3:
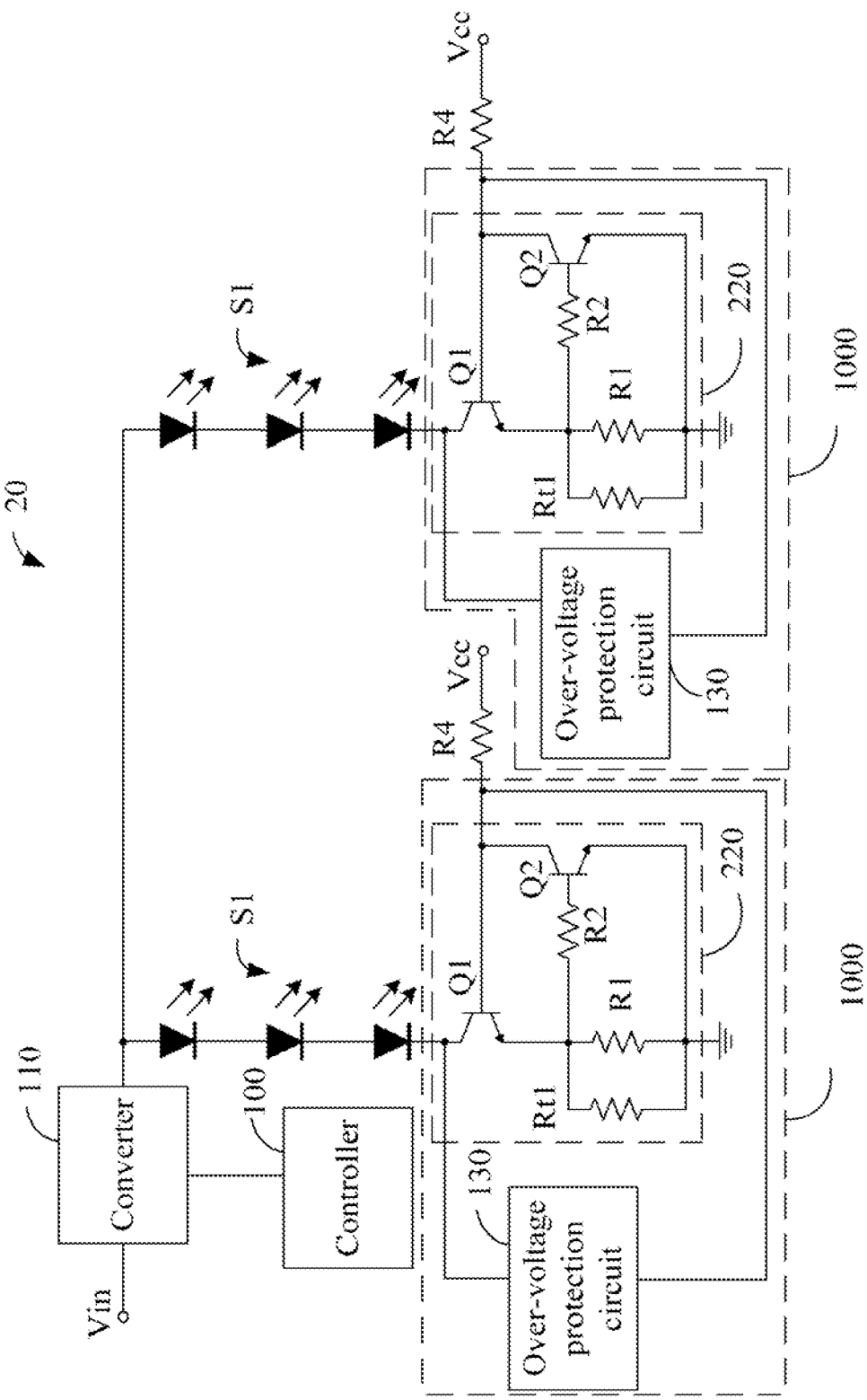
FIG. 3 is a circuit diagram of another embodiment of a LED driving system as disclosed.

FIG. 3 is a circuit diagram of another embodiment of a LED driving system 20 as disclosed. In the embodiment, the LED driving system 20 is similar to the LED driving system 10 except structure of the current limitation circuit. The difference between a current limitation circuit 220 of the FIG. 3 and the current limitation circuit 120 of the FIG. 2 is that the current limitation circuit 220 further comprises a thermal element Rt1 connected in parallel to the first resistor R1. Because the threshold voltage of the first switch Q1 and the second switch Q2 decreases along with increasing temperature, the thermal element Rt1 is connected to the first resistor R1 for compensation.

In the embodiment, the thermal element Rt1 is a negative temperature coefficient thermistor, whose resistance decreases when the temperature increases, which causes a total resistance of the thermistor and the first resistor R1 decreased. Thus, only when the current flowing through the LED strings S1 exceeds a predetermined value, the second switch Q2 is turned on to limit the current, which avoids misact.

In FIG. 1, FIG. 2 and FIG. 3, the reference voltage Vcc is supplied by an external power. In alternative embodiments, the reference voltage Vcc can also be supplied by the converter 110.

Figure 4:
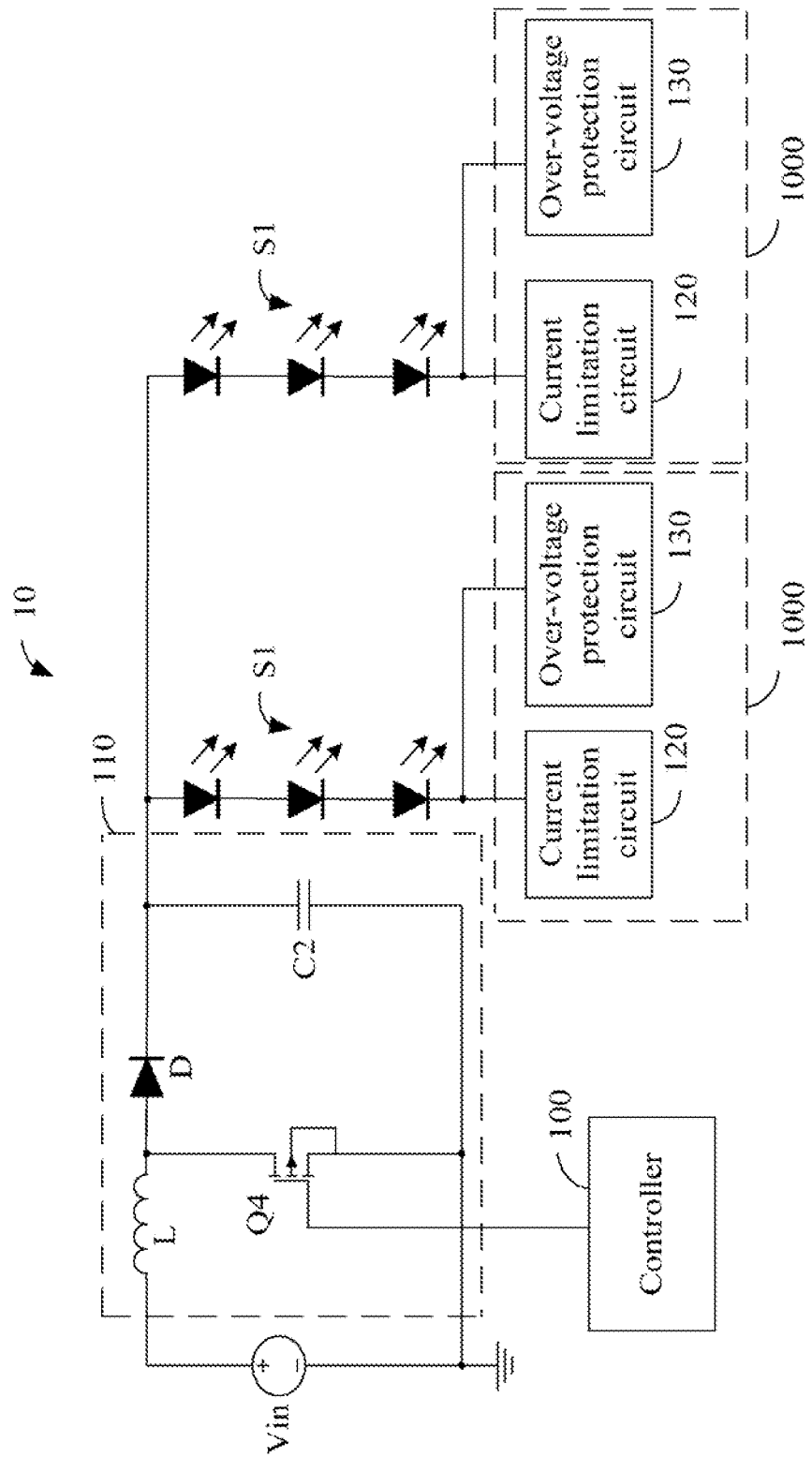
FIG. 4 is a circuit diagram of one embodiment of a converter of a LED driving system as disclosed.

FIG. 4 is a circuit diagram of one embodiment of the converter 110. In the embodiment, the converter 110 is a boost circuit, and comprises an inductor L, a fourth switch Q4 and a rectification and filter circuit comprising a first diode D and a second capacitor C2. The fourth switch Q4 converts the external power signal Vin into alternating current power signals, and comprises a control pole connected to the controller 100, a first pole connected to an anode of the first diode D and receiving the external power signal Vin via the inductor L, and a second pole grounded. In the embodiment, the fourth switch Q4 is a metal oxide semiconductor field effect transistor, the control pole is a base of the metal oxide semiconductor field effect transistor, the first pole is a drain of the metal oxide semiconductor field effect transistor and the second pole is a source of the metal oxide semiconductor field effect transistor.

The rectification and filter circuit is connected to the fourth switch Q4 and connected between the inductor L and the LED strings S1 to rectify and filter the alternating current power signal to the direct current power signal. The anode of the first diode D receives the external power signal Vin via the inductor L, and a cathode of the first diode D is connected to the LED strings S1. The second capacitor C2 is connected between the cathode of the first diode D and the ground. In alternative embodiments, the converter 110 also may be buck, isolation, non-isolation, half bridge and full bridge circuits. The converter 100 generates and output a control signal to the control pole of the fourth switch Q4 to control the fourth switch Q4 to convert the external power signal Vin.

The LED driving system 10 uses the first switch Q1 and the second switch Q2 to actively limit the current flowing through the LED strings S1, and uses the zener diode ZD1 and the third switch Q3 to do over-voltage protection, both without control of a controller, which is easy to be controlled and costs less.

The foregoing disclosure of the various embodiments has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto and their equivalents.

What is claimed is:

1. A light emitting diode (LED) driving system, to drive a plurality of LED strings, wherein the LED driving system comprises:
   a converter, to convert an external power signal into a direct current power signal able to drive the LED strings;
   a controller, to control the converter to output the direct current power signal;
   a plurality of current limitation circuits, correspondingly connected to the LED strings, wherein each of the current limitation circuits comprises:
      a first switch, comprising a control pole, a first pole, and a second pole, the control pole connected to a reference voltage, the first pole connected to a corresponding LED string, and the second pole grounded via a first resistor; and
      a second switch, comprising a control pole, a first pole and a second pole, the control pole of the second switch connected to the second pole of the first switch via a second resistor, the first pole of the second switch connected to the control pole of the first switch, and the second pole of the second switch being grounded; and
   a plurality of over-voltage protection circuits correspondingly connected to the LED strings, wherein each of the over-voltage protection circuits comprises:
      a zener diode with a cathode connected to a corresponding LED string together with the first pole of the first switch;
      a third switch, comprising a control pole, a first pole and a second pole, the control pole of the third switch connected to an anode of the zener diode by way of a third resistor, the first pole of the third switch connected to the control pole of the first switch, and the second pole of the third switch being grounded; and
      a first capacitor, connected between the control pole of the third switch and the ground;
   wherein the control pole of the first switch, the first pole of the second switch and the first pole of the third switch all connect to the reference voltage via a fourth resistor.

2. The LED driving system of claim 1, wherein the current limitation circuit further comprises a thermal element connected to the first resistor in parallel.

3. The LED driving system of claim 2, wherein the thermal element is a negative temperature coefficient thermistor.

4. The LED driving system of claim 1, wherein the first switch and the second switch are both bipolar junction transistors, the third switch is a transistor, the control poles of the first switch, the second switch and the third switch are all bases, the first poles of the first switch, the second switch and the third switch are all collectors, and the second poles of the first switch, the second switch and the third switch are all emitters.

5. The LED driving system of claim 1, wherein the converter circuit comprises:
   an inductor, one end of the inductor receiving the external power signal;
   a fourth switch, connected to the other end of the inductor to convert the external power signal and comprising a control pole; and
   a rectification and filter circuit, connected between the other end of the inductor and the LED strings and connected to the fourth switch to rectify and filter the converted external power signal to the direct current power signal.

6. The LED driving system of claim 5, wherein the rectification and filter circuit comprises:
   a diode, wherein an anode of the diode is connected to the other end of the inductor, and a cathode of the diode is connected to the LED strings; and a second capacitor, connected between the cathode of the diode and the ground.

* * * * *